(12) United States Patent
Kotaki et al.

(10) Patent No.: US 7,289,292 B2
(45) Date of Patent: Oct. 30, 2007

(54) LIBRARY APPARATUS FOR CLEANING RECORDING MEDIUM AND RECORDING/REPRODUCTION DEVICE, AND CONTROL METHOD THEREOF

(75) Inventors: Yoshio Kotaki, Kawasaki (JP); Yukio Katsuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 394 days.

(21) Appl. No.: 10/942,602

(22) Filed: Sep. 16, 2004

(65) Prior Publication Data

US 2005/0259350 A1    Nov. 24, 2005

(30) Foreign Application Priority Data

May 18, 2004    (JP)    .............................. 2004-147991

(51) Int. Cl.
G11B 15/68  (2006.01)
G11B 7/085  (2006.01)

(52) U.S. Cl. ...................... 360/92; 369/30.38
(58) Field of Classification Search .................. 360/92; 369/30.38–30.63
See application file for complete search history.

(56) References Cited

U.S. PATENT DOCUMENTS 4,970,748 A * 11/1990 Rubey .......................... 15/97.1
5,144,513 A * 9/1992 Gadsby et al. ............... 360/137
5,495,371 A    2/1996 Munemoto et al.
5,652,682 A * 7/1997 Elliott ............................ 360/92
5,894,376 A * 4/1999 Rinard ..................... 360/77.08

FOREIGN PATENT DOCUMENTS

JP    6-168425    6/1994
JP    10-064241   3/1998

* cited by examiner

Primary Examiner—A. J. Heinz
(74) Attorney, Agent, or Firm—Greer, Burns & Crain, Ltd.

(57) ABSTRACT

The invention relates to a library apparatus for use in storage, recording or reproduction of recording media, and its object is to effect a cleaning process on recording media within the apparatus. Another object is to prevent contamination of a recording/reproduction unit through cleaning process of recording media. The apparatus is arranged such that it comprises an enclosure; a recording/reproduction unit disposed in the enclosure and recording data onto a recording medium or reproducing data from the recording medium; and a cleaning unit disposed in the enclosure and cleaning the recording medium ejected from the recording/reproduction unit. The recording medium ejected from the recording/reproduction unit in response to a data check error, etc., is carried for cleaning to the cleaning unit disposed together with the recording/reproduction units in the same enclosure.

16 Claims, 12 Drawing Sheets

LIBRARY APPARATUS FOR CLEANING RECORDING MEDIUM AND RECORDING/REPRODUCTION DEVICE, AND CONTROL METHOD THEREOF

BACKGROUND OF THE INVENTION

1. Field of the Invention

The present invention relates generally to a library apparatus for use in storage, recording and reproduction of recording media such as magnetic tapes accommodated in a cartridge, and more particularly, to a library apparatus for cleansing the recording media within the apparatus and a control method thereof.

2. Description of the Related Art

Library apparatuses have hitherto been used to store magnetic tapes acting as recording media, load the magnetic tapes into a recording/reproduction device of the apparatus and write or read data. Cartridge recording media are magnetic tapes in cartridge form. A dirty magnetic tape can lead to deteriorated data recording/reproduction characteristics such as lower data read or write accuracy and dropouts, and therefore its cleaning is essential.

Japanese Patent Application Laid-Open Publication Nos. 10-64241 and 06-168425 are among related technical patent documents regarding such magnetic tape cleaning.

In the cleaning apparatus and cleaning method disclosed in Japanese Patent Application Laid-Open Publication No. 10-64241, a cartridge is provided with two cleaning tapes, and, with a magnetic tape sandwiched between the cleaning tapes, the magnetic tape and the cleaning tapes are run at different speeds, thus cleaning the magnetic tape.

In Japanese Patent Application Laid-Open Publication No. 06-168425, on the other hand, an apparatus, designed to restore the magnetic head of a magnetic recording/reproduction device to normal function and give a warning properly in the event of a failure, is configured to detect the amount of wear and degree of dirt on the magnetic head, giving a warning and loading a cleaning tape into the magnetic recording/reproduction device in response to the detection result.

Incidentally, description will be given of magnetic tape loading in a library apparatus with reference to FIG. 1. FIG. 1 shows a recording/reproduction unit of a library apparatus.

In a library apparatus 2, a plurality of recording/reproduction devices 4 are provided that are designated, for purposes of description, at #0, #1, #2 and #3, as the order of loading. Indicated by "6" is a magnetic tape as a tape medium loaded into the recording/reproduction devices 4, whereas a cleaning tape for cleaning the recording/reproduction devices 4 is indicated by "8."

In reading data of the magnetic tape 6, if the data recording surface of the magnetic tape 6 is dirty, and if the dirt is caused by adherence of dust, loading of the magnetic tape 6 into the recording/reproduction device 4 (#0) will result in the dust adhering to the recording/reproduction head of the recording/reproduction device 4 (#0) from the magnetic tape 6. Continued use of the recording/reproduction head, with dust attached, will make it impossible to read data from the magnetic tape 6 in the middle of the process, resulting in data check error. Because it cannot be determined whether the error is attributable to the magnetic tape 6 or the recording/reproduction device 4, the magnetic tape 6 is ejected from the recording/reproduction device 4 (#0) in the middle of the process and reloaded into the recording/reproduction device 4 (#1). If the magnetic tape 6 is dirty, the recording/reproduction head of the recording/reproduction device 4 (#1), into which the magnetic tape 6 is reloaded, will become dirty, resulting in the magnetic tape 6 being ejected again. If data reading is resumed, the magnetic tape 6 will eventually be removed from the library apparatus 2, after repetitions of loading and ejection, as a defective medium that cannot be handled. In arrows "a", "b", "c" and "d" shown in FIG. 1, "a" indicates loading of the magnetic tape 6, "b" ejection, "c" removal and "d" loading of the cleaning fane 8.

Removal of the magnetic tape 6 from the library apparatus 2 as a defective medium following these processes delays a judgment as to whether the magnetic tape 6 is usable. Besides, the process time for removal from the library apparatus 2 is long and wasteful. If the magnetic tape 6 is loaded into the three to four recording/reproduction devices 4, the dirt of the magnetic tape 6 will transfer, contaminating the recording/reproduction heads. If the cleaning process of the recording/reproduction heads of the recording/reproduction devices 4 (#0 to #3) is conditioned by the running distance, the cleaning tape 8 cannot be loaded even when the recording/reproduction head is dirty, unless the running distance does not reach a given distance.

Thus, with regard to the problem of avoiding inconveniences such as dirt on the magnetic tape contaminating the recording/reproduction heads of a plurality of recording/reproduction devices and delayed judgment as to whether the magnetic tape is usable, there is no disclosure or suggestion thereof in Japanese Patent Application Laid-Open Publication Nos. 10-64241 and 06-168425, nor is there any description of means for solving the problem.

SUMMARY OF THE INVENTION

The present invention relates to a library apparatus used to store, record or reproduce recording media, and it is an object of the present invention to perform a cleaning process on recording media within the apparatus.

It is another object of the present invention to prevent contamination of a recording/reproduction unit through cleaning process of recording media.

In order to achieve the above objects, according to a first aspect of the present invention there is provided a library apparatus comprising an enclosure; a recording/reproduction unit disposed in the enclosure and recording data onto a recording medium or reproducing data from the recording medium; and a cleaning unit disposed in the enclosure and cleaning the recording medium ejected from the recording/reproduction unit. In such a configuration, in the event of ejection of a recording medium from the recording/reproduction unit due, for example, to data check error, the recording medium is carried to the cleaning unit provided in the enclosure common to the recording/reproduction unit for cleaning. This quickly removes dirt from the recording medium, thus preventing contamination of the recording/reproduction unit resulting from reloading before contamination occurs.

In order to achieve the above objects, according to a second aspect of the present invention there is provided a library apparatus comprising a storage unit storing a recording medium that records data; recording/reproduction devices recording data onto the recording medium or reproducing data from the recording medium; a carrier unit carrying the recording medium between the recording/reproduction devices and the storage unit; a cleaning unit cleaning the recording medium carried from the carrier unit; and a control unit, upon detection of a data error, driving the carrier unit to carry the recording medium ejected from the recording/reproduction devices to the cleaning unit for cleaning of the recording medium.

In such a configuration, a plurality of recording media are stored in the storage unit, with the recording media carried to each of the recording/reproduction devices and recording or reproduction carried out in the same manner in all the recording/reproduction devices. The carrier unit handles carrying of the recording media between the storage unit and the recording/reproduction devices. Data recording or reproduction is carried out when the recording medium is loaded into the recording/reproduction device. In the event of a data error in the middle of reproduction, the recording medium is ejected from the recording/reproduction device through detection of the error. The recording medium ejected is carried to the cleaning unit for cleaning process, removing dirt, if any, from the recording surface of the recording medium through cleaning process. Thus, if a data error is detected at the time of data reproduction, the carrier unit carries the recording medium to the cleaning unit for cleaning process, thus keeping dirty recording media from being carried to the other recording/reproduction devices and preventing the dirt from spreading to the recording/reproduction devices.

To attain the above objects, the cleaning unit may be disposed in the enclosure which accommodates the recording/reproducing devices. In such a configuration, it is possible to cleanse the recording medium within the apparatus and carry the cleaned recording medium to the other recording/reproduction device for data reproduction. If a data error occurs during data reproduction of the cleaned recording medium in the other recording/reproduction device, it is possible to readily find out that the error is caused by the defect of the recording medium.

To attain the above objects, the cleaning unit may include a cleaning body removing dirt from medium surfaces of the recording medium carried; and a cleaning mechanism unit driving the cleaning body to run at a running speed different from that of the recording medium and pressing the cleaning body against a recording surface of the recording medium.

To attain the above objects, the cleaning unit may include first and second cleaning bodies removing dirt from the medium surfaces of the recording medium carried; a first cleaning mechanism unit pressing the first cleaning body against one side of the recording medium and driving the first cleaning body to run at a speed different from that of the recording medium; and a second cleaning mechanism unit pressing the second cleaning body against the other side of the recording medium and driving the second cleaning body to run at a speed different from that of the recording medium.

To attain the above objects, the control unit may close down the recording/reproduction device from which a data error is detected and inhibit carrying of the recording medium to the recording/reproduction device being closed down. In such a configuration, it is possible to prevent spread of dirt resulting from carrying of a recording medium to the recording/reproduction device from which a data error was detected.

To attain the above objects, the control unit may drive the carrier unit to carry the cleaning body to the recording/reproduction device being closed down to clean a recording/reproduction head of the recording/reproduction device and cancel the closing-down of the recording/reproduction device. In such a configuration, it is possible to suppress transfer of dirt by carrying the cleaning body to the recording/reproduction device being closed down and by canceling the closing-down of the recording/reproduction device after cleaning of the recording/reproduction head.

In order to achieve the above objects, according to a third aspect of the present invention there is provided a library apparatus comprising a storage unit storing a cartridge that accommodates a recording medium that records data; a carrier unit carrying the cartridge; a recording/reproduction unit recording data onto the recording medium or reproducing data from the recording medium; a cleaning unit cleaning the recording medium; and a control unit driving the carrier unit to carry the cartridge ejected from the recording/reproduction unit to the cleaning unit for cleaning of the recording medium. That is, the recording media may be accommodated in a cartridge and stored in the storage unit.

To attain the above objects, the cartridge may be carried from the recording/reproduction unit to the cleaning unit through detection of a data error.

In order to achieve the above objects, according to a fourth aspect of the present invention there is provided a library apparatus control method comprising the steps of loading a recording medium into one of a plurality of recording/reproduction devices and recording or reproducing data; cleaning the recording medium in the event of a data error during the recording or reproduction; and loading the cleaned recording medium into the recording/reproduction device other than the recording/reproduction device that produced the data error and recording or reproducing data.

In order to achieve the above objects, according to a fifth aspect of the present invention there is provided a control method for a library apparatus provided with a plurality of recording/reproduction devices, the library apparatus recording or reproducing data by carrying a recording medium from a storage unit that stores the recording medium to the recording/reproduction devices using a carrier unit, the control method comprising the steps of, upon detection of a data error, driving the recording medium to be ejected from the recording/reproduction device in the middle of process; driving the carrier unit to carry the recording medium, ejected from the recording/reproduction device, to the cleaning unit for cleaning of the recording medium; closing down the recording/reproduction device from which the data error was detected and inhibiting carrying of the recording medium to the recording/reproduction device being closed down; and carrying the cleaned recording medium to the recording/reproduction device other than the recording/reproduction device being closed down.

As set forth hereinabove, the present invention is advantageous in that it has the recording/reproduction unit and the cleaning unit provided within the apparatus, and that the recording medium is cleaned prior to reloading in the event of detection of a data error, thus keeping dirt on the recording medium from spreading to the recording/reproduction unit and contributing to faster cleaning process, stable data processing and easier maintenance and management of the library apparatus.

The advantages and effects of the present invention are:

(1) The recording medium ejected from the recording/reproduction unit can be cleaned and restored, thus preventing spread of dirt as no dirty recording medium is reloaded.

(2) The recording medium can be quickly cleaned in response to occurrence of a data error, ensuring stable data recording or reproduction.

(3) It is possible, by cleaning the recording medium in response to ejection of the recording medium from the recording/reproduction unit, by closing down the recording/reproduction device and inhibiting carrying of the recording medium in parallel with cleaning process, and by canceling the closing-down thereof after cleaning process, to prevent spread of dirt, thus ensuring stable data recording or reproduction.

(4) It is possible to simplify maintenance and management of the library apparatus.

BRIEF DESCRIPTION OF THE DRAWINGS

The other objects, features and advantages of the present invention will become more apparent from the following description of embodiments when taken in conjunction with the accompanying drawings, in which.

DETAILED DESCRIPTION OF THE PREFERRED EMBODIMENTS

Figure 2:
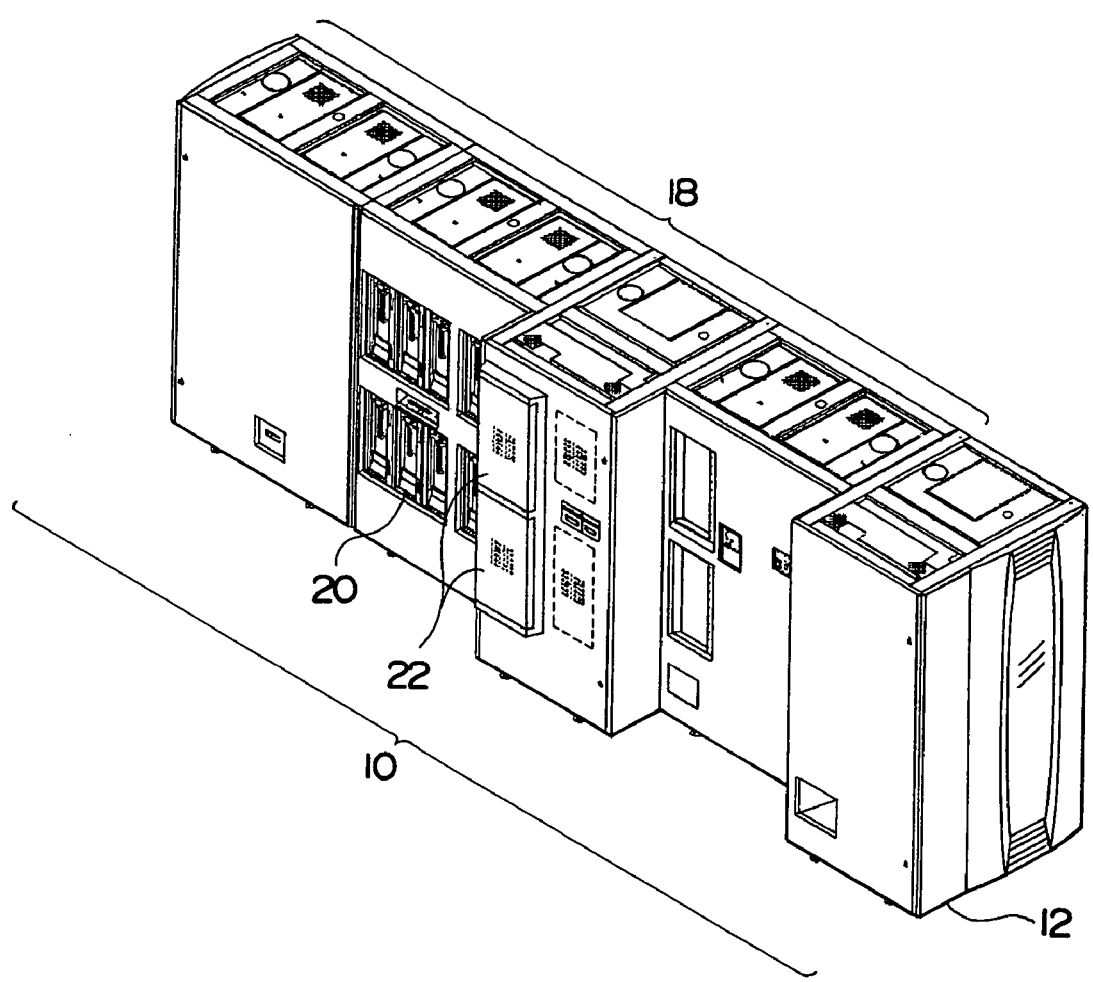
FIG. 2 is a perspective view showing the outline of a library apparatus according to an embodiment of the present invention.
Figure 3:
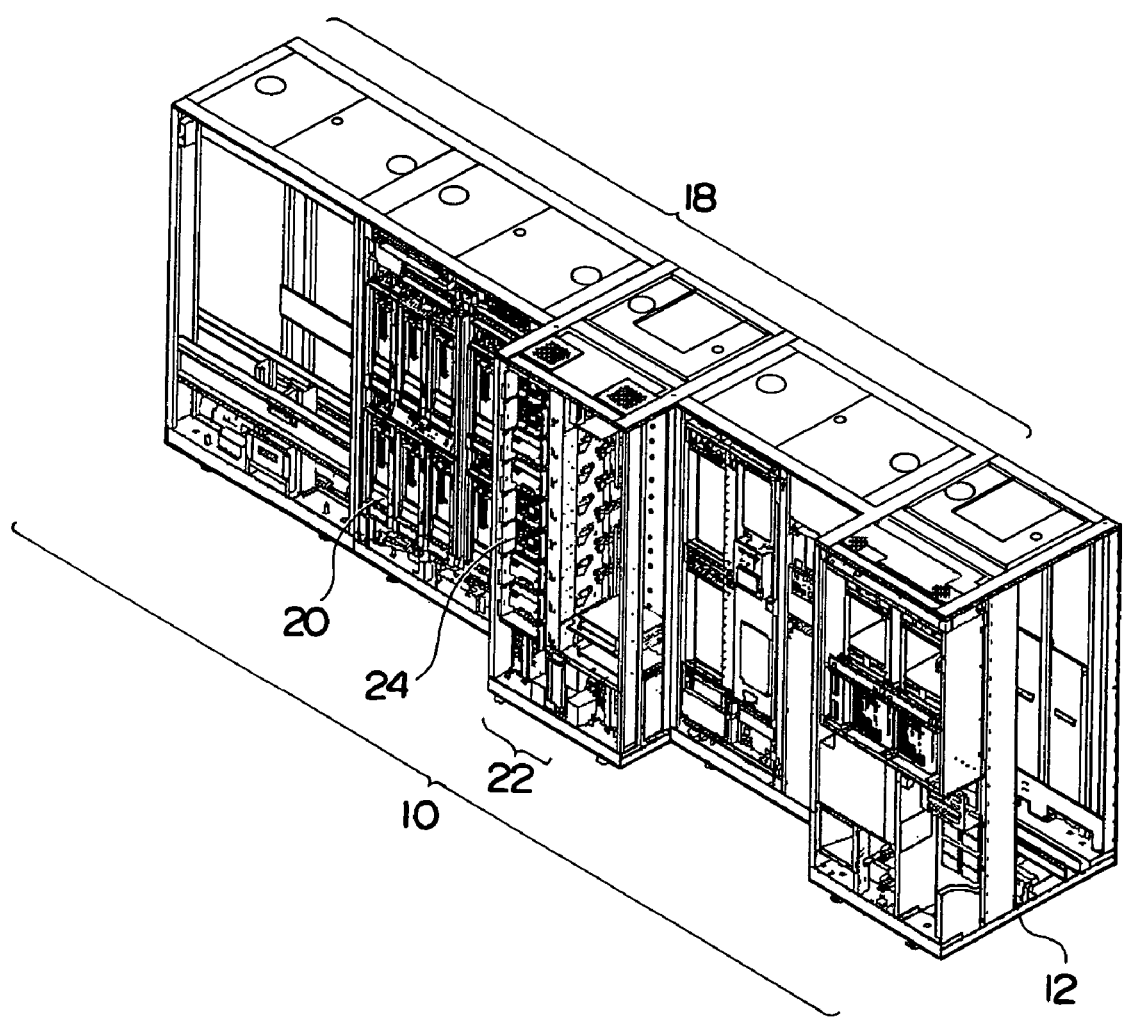
FIG. 3 is a perspective view showing the outline of the library apparatus according to the embodiment.

Description will be given of embodiments of the present invention with reference to FIGS. 2 and 3. FIG. 2 is a perspective view showing the appearance of the library apparatus, whereas FIG. 3 is a perspective view showing the outline of inner structure of the library apparatus.

In an enclosure 12 of a library apparatus 10, there are provided a media storage unit 18 for storing tape media 14 (FIG. 6) as recording media and a cleaning tape 16 (FIG. 6) as a cleaning body, a carrier unit 20 for carrying the tape media 14, a recording/reproduction unit 22 for performing recording or reproduction, and so on. The tape media 14 are, for example, accommodated in a cartridge 36 (FIG. 11) and stored in the media storage unit 18. On the other hand, the cleaning tape 16 (FIG. 6) makes up a head cleaning body for cleaning the recording/reproduction head of the recording/reproduction unit 22. In the recording/reproduction unit 22, there are provided a plurality of recording/reproduction devices 24 as tape drive devices. There, the tape media 14, carried by the carrier unit 20, are loaded into the recording/reproduction devices 24 for magnetic recording of data, followed by storage in the media storage unit 18. The tape media 14 are loaded again from the media storage unit 18 into the recording/reproduction devices 24 for data readout, followed by carrying to given locations in the media storage unit 18 for storage.

Figure 4:
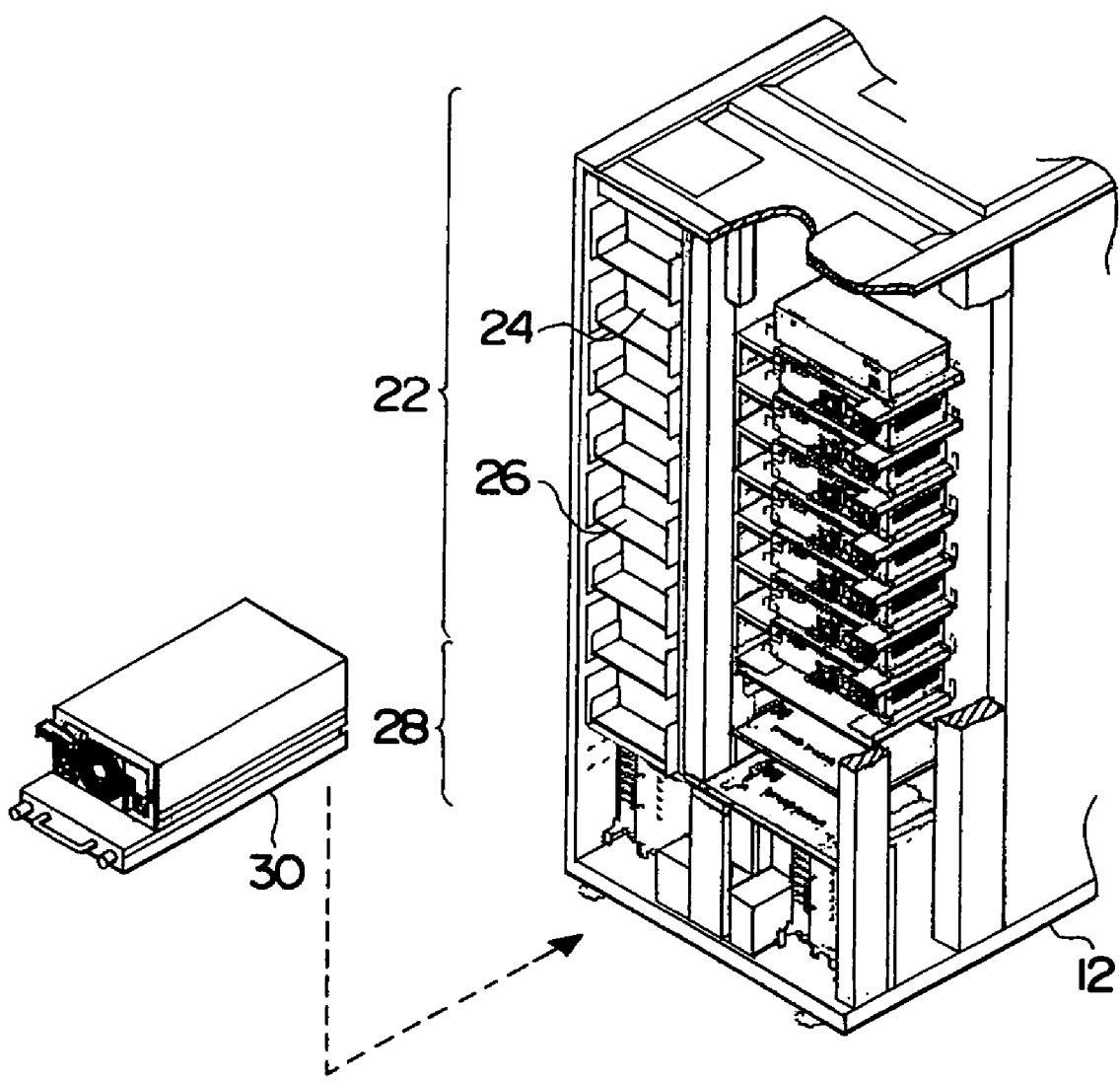
FIG. 4 is a perspective view showing a recording/reproduction unit, a cleaning unit and a cleaning drive device.
Figure 5:
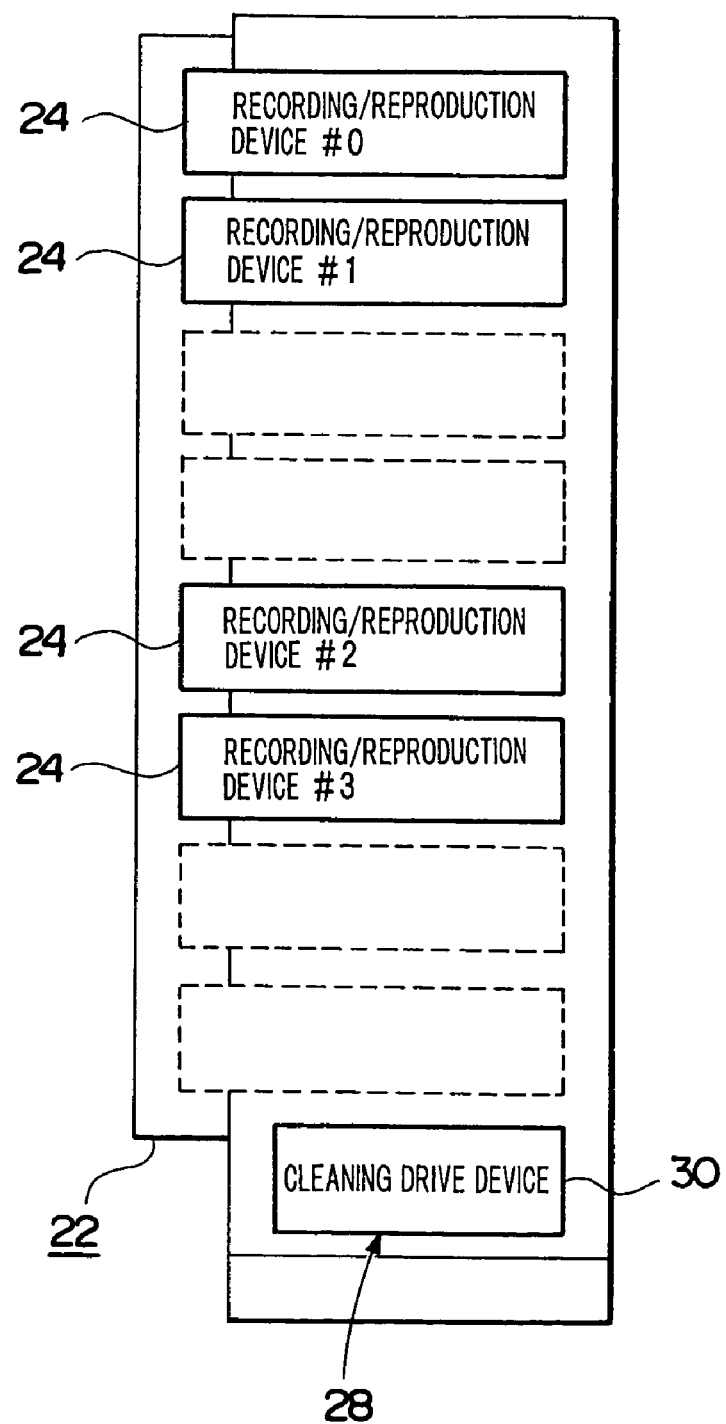
FIG. 5 is a block diagram showing a configuration of the recording/reproduction unit and the cleaning unit.

Description will be given next of the recording/reproduction unit 22 of the library apparatus 10 with reference to FIGS. 4 and 5. FIG. 4 is an exploded perspective view showing the recording/reproduction unit 22 and the cleaning unit, whereas FIG. 5 is a block diagram showing a configuration of the recording/reproduction unit 22 and the cleaning unit.

There are provided a plurality of shelf portions 26 in the recording/reproduction unit 22, with the recording/reproduction device 24 provided in the upper space of each of the shelf portions 26. In the present embodiment, there is provided a cleaning drive device 30 in a cleaning unit 28 set up on the lower stage side of the recording/reproduction unit 22. The cleaning drive device 30 is a cleaning device intended to clean the tape media 14, recording media. Thus, the cleaning drive device 30 is incorporated in the library apparatus 10, thus making it possible to cleanse the tape media 14 with the cleaning drive device 30 in the library apparatus 10.

In the recording/reproduction unit 22, on the other hand, there are provided the plurality of recording/reproduction devices 24, with #0, #1, #2 and #3 indicating an example of order of loading of the tape medium 14.

Figure 6:
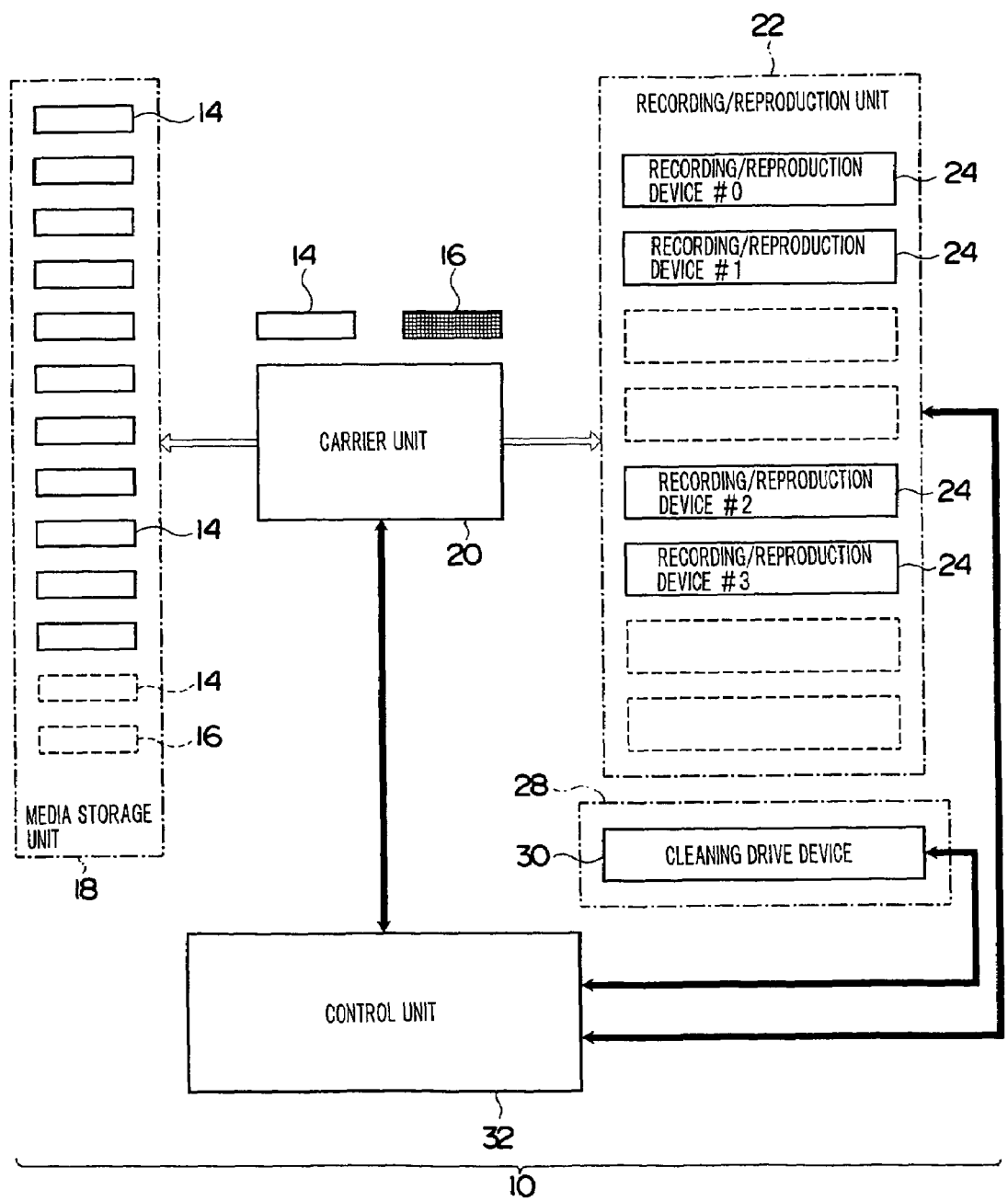
FIG. 6 is a block diagram showing a functional unit of the library apparatus.

Description will be given next of the library apparatus 10 provided with the cleaning drive device 30 with reference to FIG. 6. FIG. 6 is a block diagram showing the outline of the library apparatus 10.

Figure 1:
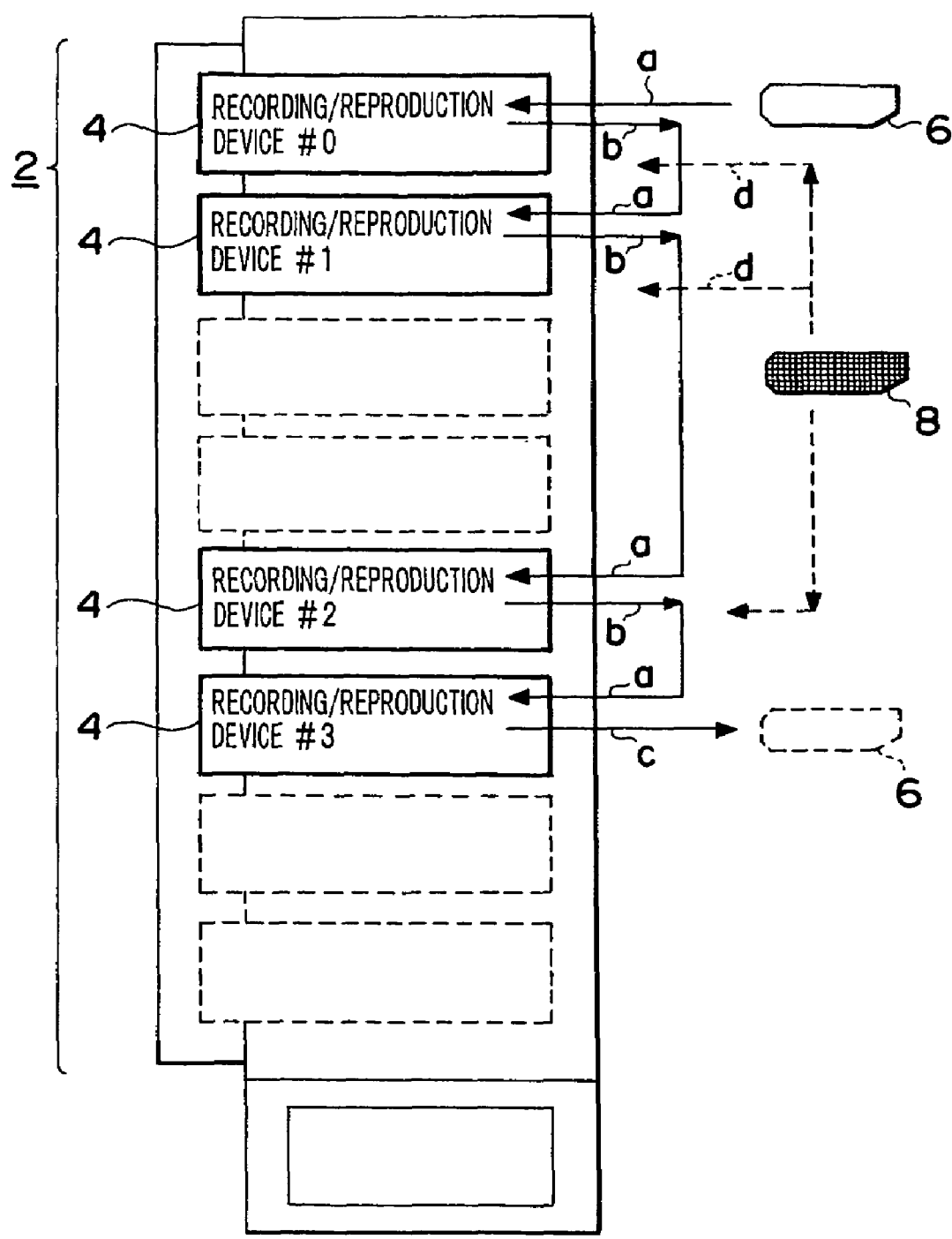
FIG. 1 is a view showing a form of contamination of a plurality of recording/reproduction devices.

As mentioned earlier, being provided with the media storage unit 18, the carrier unit 20, the recording/reproduction unit 22, the cleaning unit 28 and so on within the enclosure 12 (FIGS. 1 and 2), the library apparatus 10 is equipped with a control unit 32 for controlling the carrier unit 20, the recording/reproduction devices 24 of the recording/reproduction unit 22, the cleaning drive device 30 of the cleaning unit 28, etc. The control unit 32 may be provided inside or outside the enclosure 12. Provided with a processor, storage device and so on, the control unit 32 imparts to the carrier unit 20, in response to data recording, reproduction or other instruction, a carry instruction to carry the tape medium 14 or the cleaning tape 16 from the media storage unit 18 and gives a data recording or reproduction instruction to the recording/reproduction unit 22 and imparts an operation instruction to the cleaning drive device 30. The control unit 32 also detects data check (error) through the recording/reproduction devices 24 and directs, based on the detection, various control tasks including closing down the data error-producing recording/reproduction device 24 and canceling the closing-down. Provided with a carrier mechanism for carrying the tape media 14 stored in the media storage unit 18 and the tape media 14 to be stored to the media storage unit 18, the carrier unit 20 extracts the tape media 14 from given storage locations or stores them in instructed storage locations based on instructions from the control unit 32.

Figure 7:
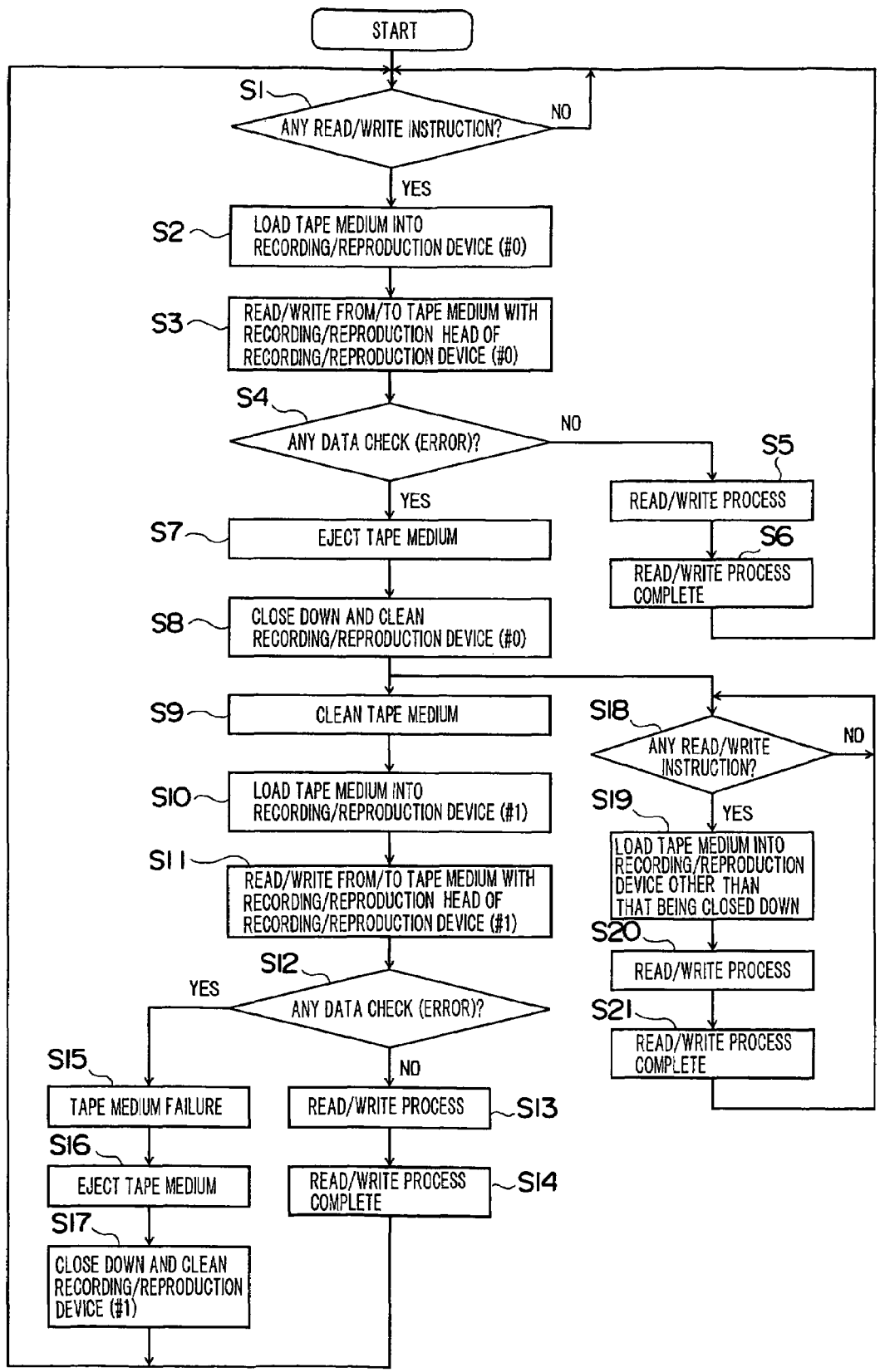
FIG. 7 is a flowchart showing a recording or reproduction process of a tape medium.
Figure 8:
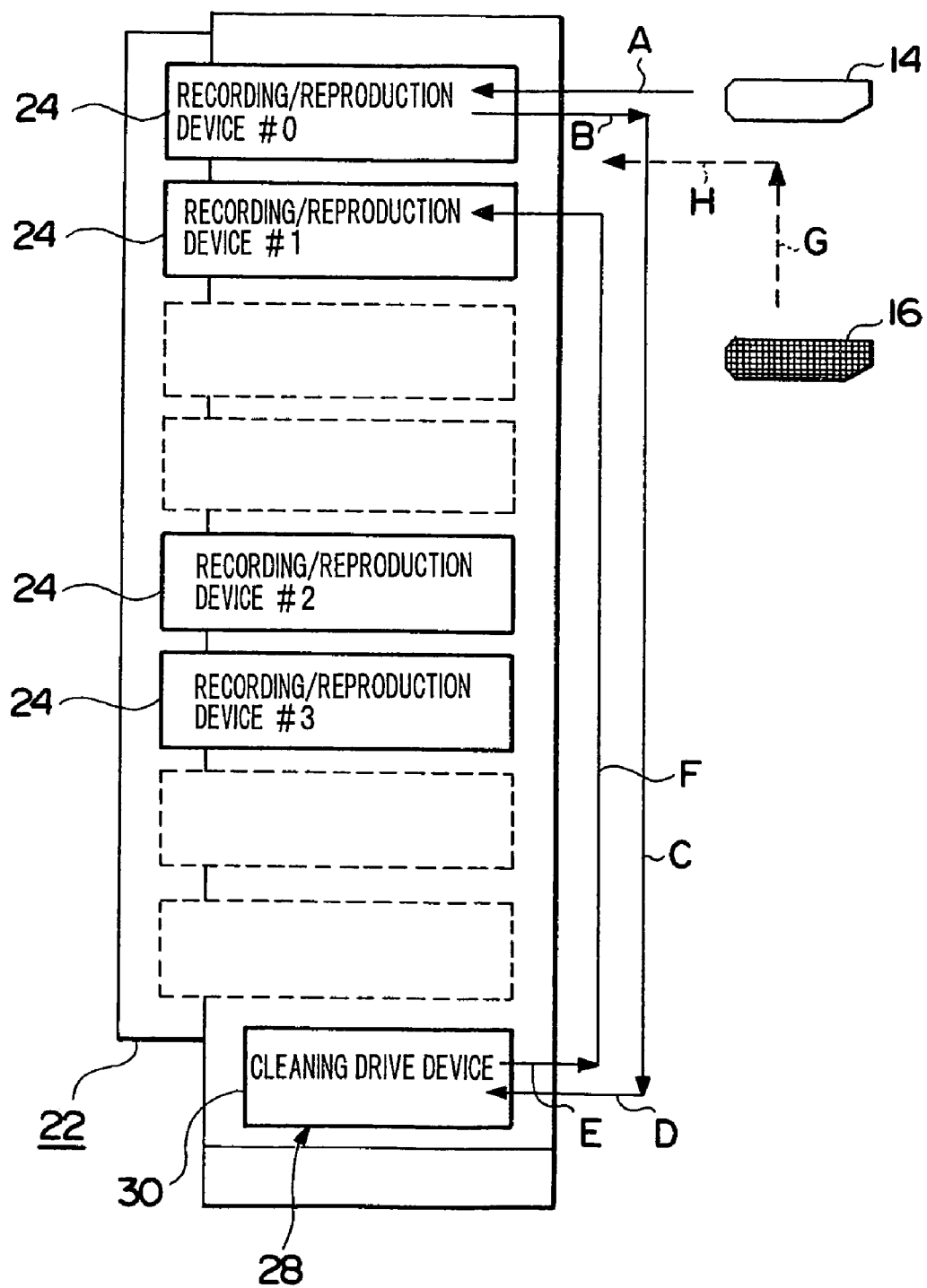
FIG. 8 is a view showing processes of the tape medium and cleaning process in the recording/reproduction unit.

Description will be given next of processes of the tape media and so on with reference to FIGS. 7 and 8. FIG. 7 is a flowchart showing the outline of tape media recording/reproduction, cleaning, etc., whereas FIG. 8 shows processes and cleaning of the tape media in the recording/reproduction unit.

The control unit 32 remains on standby until a data read/write instruction is issued from a host computer that is not shown (Step S1), and based on the read/write instruction, the predetermined tape medium 14 is carried from the media storage unit 18 by the carrier unit 20, thus causing the tape medium 14 to be loaded, for example, into the recording/reproduction device 24 (#0) (Step S2). Once the tape medium 14 is loaded, data read/write is performed by the recording/reproduction head in the recording/reproduction device 24 (#0) (Step S3), and in the middle of this data processing, a judgment is made as to whether data read/write is possible (Step S4). In the absence of data check (error), the data read/write process is resumed (Step S5), and at the completion of the data read/write process (Step S6), the procedure returns to Step S1. In this case, at the completion of the read/write process, the tape medium 14 is unloaded and carried to a given position in the media storage unit 18 by the carrier unit 20 for storage.

Figure 9:
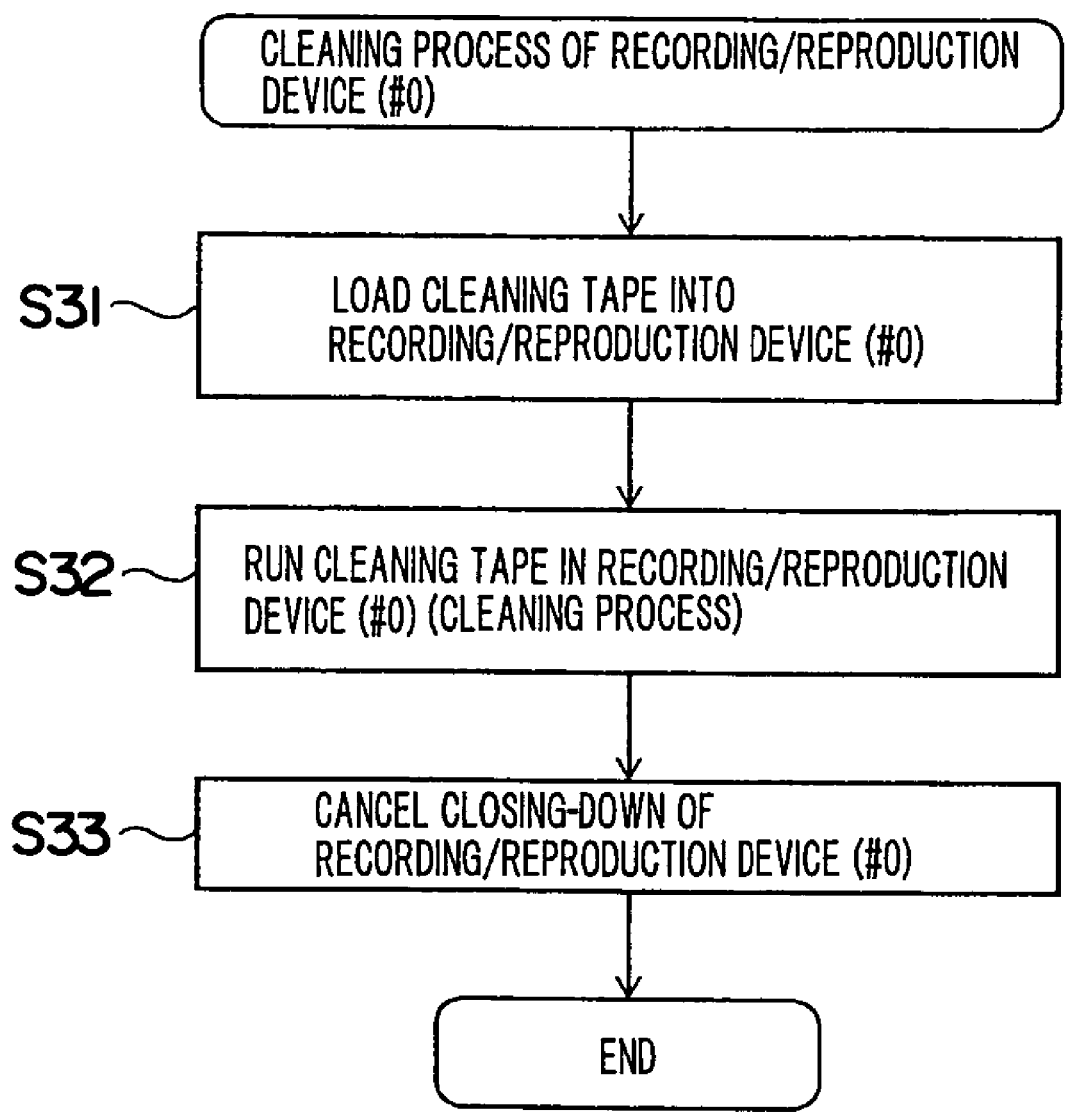
FIG. 9 is a flowchart showing cleaning process of the recording/reproduction device.

In the event of a data error in the recording/reproduction device 24 (#0) (Step S4), the tape medium 14 being loaded is ejected (Step S7), closing down the recording/reproduction device 24 (#0) from which the data error was detected and proceeding with the cleaning process thereof (Step S8) (FIG. 9).

The tape medium 14 ejected from the recording/reproduction device 24 (#0) is cleansed through the cleaning process (Step S9). In this cleaning process, the tape medium 14 is loaded by the carrier unit 20 into the cleaning drive device 30 of the cleaning unit 28, where the tape medium 14 is cleaned, while being run, over the entire length of its recording surface.

At the completion of the cleaning process, the tape medium 14 is loaded into the recording/reproduction device 24 (#1) (Step S10). In the recording/reproduction device 24 (#1) loaded with the tape medium 14, data read/write is performed by the recording/reproduction head (Step S11), and in the middle of this data processing, a judgment is made as to whether data read/write is possible (Step S12). In the absence of data check (error), the data read/write process is resumed (Step S13), and at the completion of the data read/write process (Step S14), the procedure returns to Step S1. At the completion of the read/write process, the tape medium 14 is unloaded and carried to a given position in the media storage unit 18 by the carrier unit 20 for storage.

Incidentally, if a data error is detected in the recording/reproduction device 24 (#1) (Step S12), this means that a data error has been detected both in the recording/reproduction devices 24 (#0) and (#1). As mentioned earlier, this means that the cleaned tape medium 14 could not avoid data error despite change to the recording/reproduction device 24 (#1). This is not a data error attributable to dirt on the tape medium 14 such as dust but a medium failure of the tape medium 14 (Step S15). In this case, the faulty tape medium 14 is removed from the library apparatus 10 (Step S16), followed by closing-down of the recording/reproduction device 24 (#1) and cancellation of the closing-down (Step S17) (FIG. 10), after which the procedure returns to Step S1.

Arrival of another read/write instruction is expected in the middle of process in Step S8. In this case, a judgment is made, in the course of the process, as to whether a read/write instruction has been issued (Step S18), and the recording/reproduction device 24 (#2) is selected, for example, as the recording/reproduction device 24 that is not closed down. The tape medium 14 carried by the carrier unit 20 is loaded into the recording/reproduction device 24 (#2) (Step S19) where the data read/write process is performed (Step S20). At the completion of the data read/write process (Step S21), the procedure returns to Step S9. It is to be noted that arrival of another read/write instruction is expected in the middle of the process in Step S17. In this case, the processes in Steps S18, S19, S20 and S21 are carried out similarly, after which the procedure returns to Step S1.

Describing carrying of the tape medium 14 and the cleaning tape 16 in the above processes with reference to FIG. 8, the tape medium 14 carried from the media storage unit 18 is loaded into the recording/reproduction device 24 (#0) (arrow A) and ejected as a result of detection of a data error (arrow B). The data error-producing tape medium 14 is carried to the cleaning drive device 30 (arrows C and D), and carried, after the cleaning process, to the recording/reproduction device 24 (#1) (arrows E and F) for loading. On the other hand, the cleaning tape 16, carried from the media storage unit 18, is loaded into the data error-producing recording/reproduction device 24 (#0) (arrows G and H), thus performing the cleaning process.

Description will be given next of the cleaning process (Steps S8 and S17) of the recording/reproduction devices after closing-down with reference to FIGS. 9 and 10. FIG. 9 is a flowchart showing the cleaning process of the recording/reproduction device 24 (#0), whereas FIG. 10 is a flowchart showing the cleaning process of the recording/reproduction device 24 (#1).

In the cleaning process of the recording/reproduction device 24 (#0), the cleaning tape 16 is carried to the recording/reproduction device 24 (#0) from the media storage unit 18 by the carrier unit 20 and loaded (Step S31), as shown in FIG. 9. The recording/reproduction head of the recording/reproduction device 24 (#0) is cleaned by running the cleaning tape 16 (Step S32), and at the completion of the cleaning process, the closing-down of the recording/reproduction device 24 (#0) being closed down is canceled (Step S33), thus restoring the recording/reproduction device 24 (#0).

Figure 10:
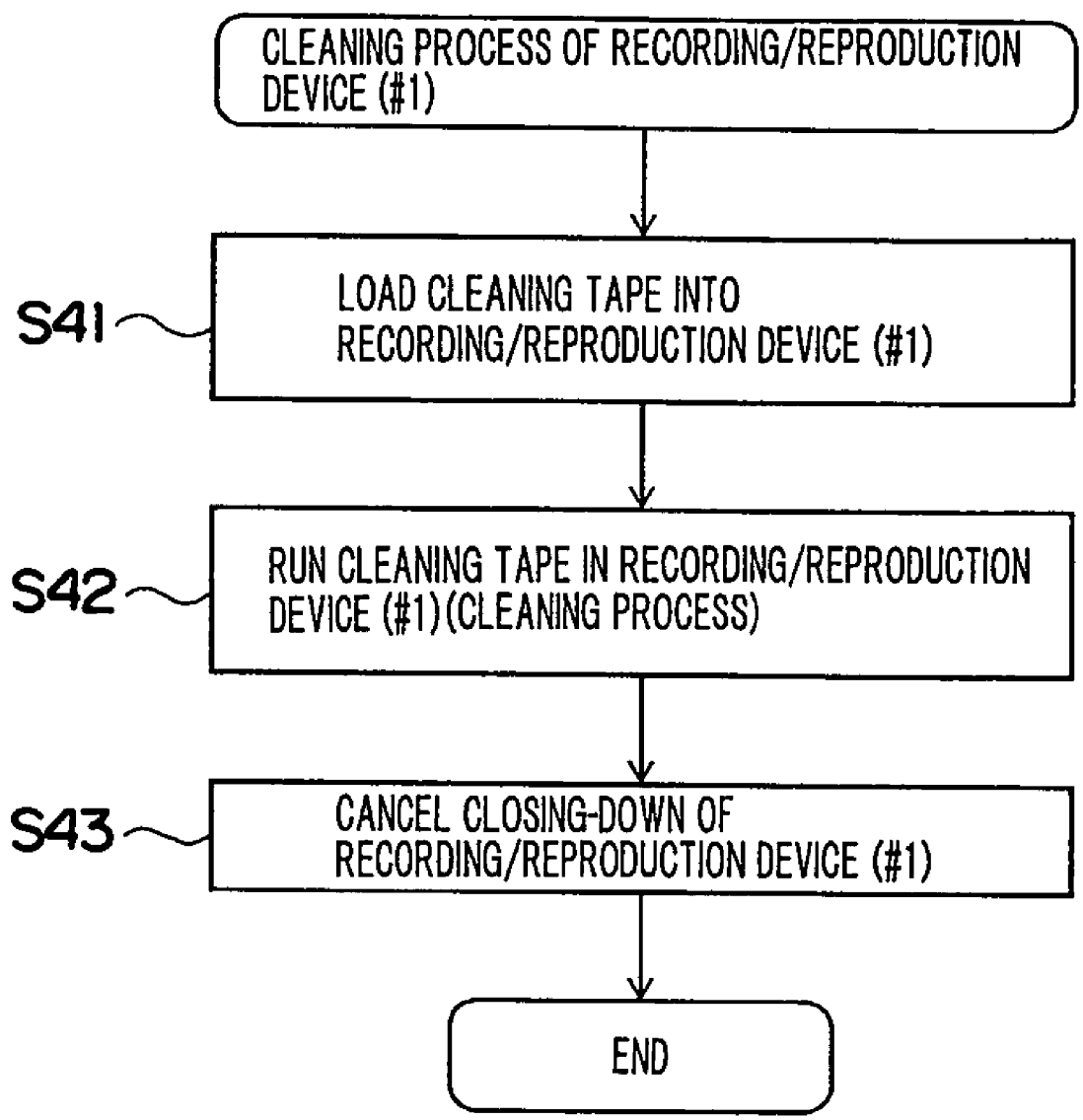
FIG. 10 is a flowchart showing cleaning process of the recording/reproduction device.

In the cleaning process of the recording/reproduction device 24 (#1), on the other hand, the cleaning tape 16 is carried to the recording/reproduction device 24 (#1) from the media storage unit 18 by the carrier unit 20 and loaded (Step S41), as shown in FIG. 10. The recording/reproduction head of the recording/reproduction device 24 (#1) is cleaned by running the cleaning tape 16 (Step S42), and at the completion of the cleaning process, the closing-down of the recording/reproduction device 24 (#1) being closed down is canceled (Step S43), thus restoring the recording/reproduction device 24 (#1).

The features and advantages of the library apparatus control described above are:

(1) In the event of detection of a data error after loading of the tape medium 14 into any one of the plurality of recording/reproduction devices 24, the data error-producing recording/reproduction device is closed down, and loading of the tape medium 14 is inhibited until the cleaning process is complete on the data error-producing recording/reproduction device. This inhibits use of the recording/reproduction device 24 expected to be contaminated by dirt on the tape medium 14, thus preventing contamination of the other tape media 14 and recording/reproduction devices 24. It is possible to minimize contamination due to dirt on the tape medium 14.

(2) In the event of detection of a data error after loading of the tape medium 14 into any one of the plurality of recording/reproduction devices 24, the cleaning process is performed on the data error-producing tape medium 14, and at the completion of the cleaning process, the tape medium 14 is loaded into the recording/reproduction device 24 other than the recording/reproduction device 24 that produced a data error. When no data error occurs, this means that dirt has been removed from the tape medium 14. On the other hand, if a data error occurs despite changing of the recording/reproduction device 24, the tape medium 14 is anomalous, and therefore the tape medium 14 is ejected as medium failure. That is, since the cleaning process of the tape medium 14 is performed when the recording/reproduction devices 24 are switched from one to another, it is possible to determine, in a short period of time, which of the tape medium 14 and the recording/reproduction device 24 is anomalous, thus speeding up the processes.

(3) When the data error-producing recording/reproduction device 24 is closed down, it is possible to perform the cleaning process thereof and of the data error-producing tape medium 14 in parallel, and simultaneously make a judgment as to anomaly and carry out the restoration process, thus ensuring higher efficiency and speedup in the processes.

(4) In the event of issuance of a read/write instruction in the course of the judgment as to anomaly or restoration process, it is possible to record or reproduce data using the recording/reproduction device 24 other than the recording/reproduction device 24 being closed down, thus ensuring higher efficiency and speedup in the processes. As mentioned earlier, contamination of the recording/reproduction devices 24 due to dirt on the tape medium 14 is kept to a minimum, thus keeping the recording/reproduction devices 24 cleansed and data processing free of interruptions.

Figure 11:
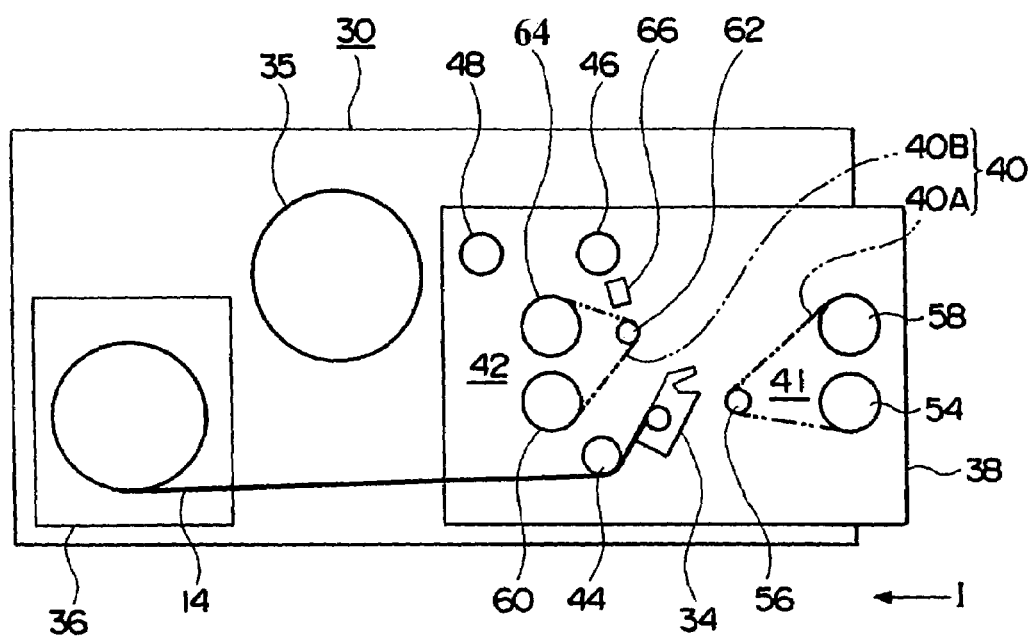
FIG. 11 is a view showing the outline of the cleaning drive device and loading of the tape medium.
Figure 12:
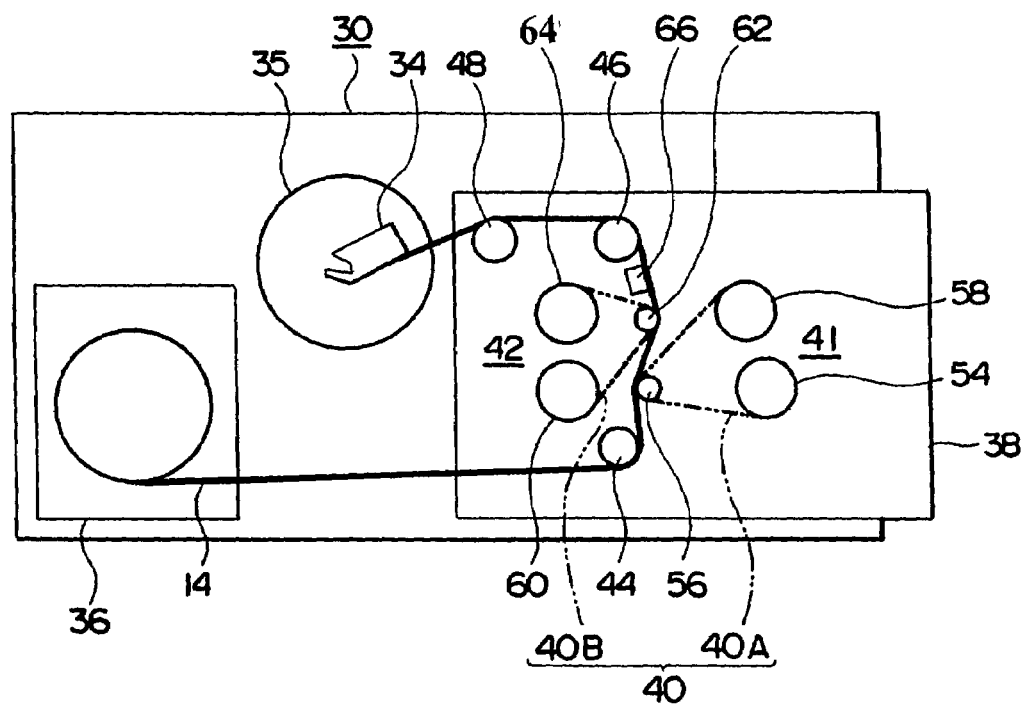
FIG. 12 is a view showing cleaning operation of the tape medium.

Description will be given next of the cleaning drive device and the cleaning process thereof with reference to FIGS. 11 and 12. FIG. 11 is a view showing the cleaning drive device and loading of the tape medium in progress, whereas FIG. 12 is a view showing the cleaning operation of the tape medium.

In the cleaning drive device 30 provided in the cleaning unit 28, there is provided a cleaning mechanism 38. In the cleaning mechanism 38, there are provided a leader lock 34 for gripping and guiding the tape medium 14, a tape takeup reel 35 for winding the tape medium 14, and so on. The tape medium 14 is accommodated in the tape media cartridge 36. In the present embodiment, there are provided first and second cleaning ribbons 40A and 40B as media cleaning bodies used to clean the recording media. In the cleaning mechanism 38, there are provided first and second cleaning mechanism units 41 and 42 and roller guides 44, 46 and 48 for guiding the tape medium 14 as guiding units. The cleaning mechanism units 41 and 42 are provided so as to sandwich the running tape medium 14, with the cleaning ribbon 40A rewound from a reel unit 54 and wound onto a ribbon takeup reel 58 via a ribbon guide 56 and the cleaning ribbon 40B rewound from a reel unit 60 and wound onto a ribbon takeup reel 64 via a ribbon guide 62. Between the ribbon guide 62 and the roller guide 46, there is provided a cleaner blade 66 as a removal unit for removing foreign objects from the surface of the running tape medium 14 by friction.

When the cartridge 36 accommodating the tape medium 14 is mounted in the cleaning drive device 30, the tape medium 14 rewound from the cartridge 36 is guided by the leader lock 34 and wound onto the takeup reel 35 via the roller guides 44, 46 and 48 within the cleaning mechanism 38. In this condition, the cleaning mechanism unit 41 moves in the direction (arrow I) opposed to the cleaning mechanism unit 42, sandwiching the tape medium 14 between the cleaning ribbons 40A and 40B and pressing the cleaning ribbon 40A in contact with one side of the tape medium 14 and the cleaning ribbon 40B in contact with the other side thereof (FIG. 12).

In this condition, the tape medium 14 is run at a constant speed $V_1$, and the cleaning ribbons 40A and 40B are run similarly at a constant speed $V_2$. In this case, the relationship in magnitude between the running speeds $V_1$ and $V_2$ is $V_1 > V_2$ so that friction occurs between the tape medium 14 and the cleaning ribbons 40A and 40B as the tape medium 14 is run. The cleaning ribbons 40A and 40B are made, for example, of Japanese paper.

Due to such a running relationship, the tape medium 14 is cleared of dirt such as dust by the cleaning ribbons 40A and 40B running at the different speed as the front and back surfaces thereof are pressed against the cleaning ribbons 40A and 40B, and then the tape medium 14 is wound onto the takeup reel 35. Since dirt may not be removable with the cleaning ribbons 40A and 40B depending on the dirt, stubborn dirt is complemented by friction with the cleaner blade 66, thus enhancing effectiveness of cleaning.

Through the cleaning process, the tape medium 14 is cleansed over the entire length of its recording surface. At the completion of the cleaning process, the tape medium 14 is rewound into the cartridge 36 and carried together with the cartridge 36, for example, to the recording/reproduction device 24 (#1) by the carrier unit 20, as mentioned earlier.

Modifications of the above embodiment are:

(1) While in the above embodiment, the tape medium 14 accommodated in the cartridge is taken as an example, the recording medium is not limited to the tape medium 14. As for the relationship with the cartridge, on the other hand, the tape medium 14 may be accommodated or not accommodated in the cartridge.

(2) While in the above embodiment, contamination of the recording/reproduction devices 24 is taken as an example due to carry of dirt on the tape medium 14, the same process can resolve data error caused by transfer of dirt on the recording/reproduction head of the recording/reproduction device 24 to the tape medium 14.

(3) While in the above embodiment, there are provided the four recording/reproduction devices 24, as an example, with loading performed from the recording/reproduction device 24 (#0) to the recording/reproduction device 24 (#1), loading may be performed from the recording/reproduction device 24 (#2) to the recording/reproduction device 24 (#3), and the five or more recording/reproduction devices 24 may be provided. Alternatively, the same process may be performed with the three or less recording/reproduction devices 24 provided.

(4) While in the above embodiment, description was given of a case in which the cleaning ribbons 40A and 40B are used as the first and second cleaning bodies for cleaning the tape medium 14, the recording medium such as the tape medium 14 may be cleansed through the cleaning process using cleaning bodies other than the cleaning ribbons.

While the most preferred embodiments of the present invention have been described hereinabove, the present invention is not limited to the above embodiments, and it is a matter of course that various variations and modifications can be made by those skilled in the art within the scope of the claims without departing from the spirit of the invention disclosed herein, and needless to say, such variations and modifications are also encompassed in the scope of the present invention.

The entire disclosure of Japanese Patent Application No. 2004-147991 including specification, claims, drawings and summary are incorporated herein by reference in its entirety.

What is claimed is:

1. A library apparatus comprising:
an enclosure;
a plurality of recording/reproduction units disposed in the enclosure, each recording/reproduction unit recording data provided for recording onto a recording medium or reproducing data from the recording medium; and a cleaning unit disposed in the enclosure for cleaning the recording medium, wherein when data recording/reproduction for a particular recording medium is unable to be performed in one recording/reproduction unit, the particular recording medium is cleaned by the cleaning unit so that another recording/reproduction unit is used to record data onto the cleaned recording medium or reproduce data from the cleaned recording medium.

2. The library apparatus of claim 1, wherein the cleaning unit includes:

a cleaning body removing dirt from medium surfaces of the recording medium carried from the one recording/reproduction unit; and a cleaning mechanism unit driving the cleaning body to run at a running speed different from that of the recording medium and pressing the cleaning body against a recording surface of the recording medium.

3. The library apparatus of claim 1, wherein the cleaning unit includes:

first and second cleaning bodies removing dirt from the medium surfaces of the recording medium carried from the one recording/reproduction unit;

a first cleaning mechanism unit pressing the first cleaning body against one side of the recording medium and driving the first cleaning body to run at a speed different from that of the recording medium; and a second cleaning mechanism unit pressing the second cleaning body against the other side of the recording medium and driving the second cleaning body to run at a speed different from that of the recording medium.

4. A library apparatus comprising:

a storage unit storing a recording medium that records data;

a plurality of recording/reproduction devices recording data provided for recording onto the recording medium or reproducing data from the recording medium recording the data;

a carrier unit carrying the recording medium between the recording/reproduction devices and the storage unit;

a cleaning unit cleaning the recording medium carried from the storage unit or one of the recording/reproduction devices by the carrier unit; and a control unit causing the carrier unit to carry the recording medium from the recording/reproduction devices to the cleaning unit for cleaning the recording medium when data recording/reproduction is unable to be performed by the recording medium.

wherein when data recording/reproduction is unable to be performed, the recording medium is cleaned by the cleaning unit so that another recording/reproduction device is used to record data onto the cleaned recording medium or reproduce data from the cleaned recording medium.

5. The library apparatus of claim 4, wherein the cleaning unit is disposed in the enclosure in which the recording/reproduction devices are disposed.

6. The library apparatus of claim 4, wherein the cleaning unit includes:

a cleaning body removing dirt from the medium surface of the recording medium carried; and a cleaning mechanism unit driving the cleaning body to run at a running speed different from that of the recording medium and pressing the cleaning body against a recording surface of the recording medium.

7. The library apparatus of claim 4, wherein the cleaning unit includes:

first and second cleaning bodies removing dirt from the medium surfaces of the recording medium carried;

a first cleaning mechanism unit pressing the first cleaning body against one side of the recording medium and driving the first cleaning body to run at a speed different from that of the recording medium; and a second cleaning mechanism unit pressing the second cleaning body against the other side of the recording medium and driving the second cleaning body to run at a speed different from that of the recording medium.

8. The library apparatus of claim 4, wherein the control unit closes down the recording/reproduction device in which data recording/reproduction is unable to be performed for the recording medium, and inhibits the carrier unit from carrying the recording medium to the recording/reproduction device being closed down.

9. The library apparatus of claim 4, wherein the control unit closes down the recording/reproduction device unable to record/reproduce data, drives the carrier unit to carry a cleaning body to the recording/reproduction device being closed down to clean a recording/reproduction head of the recording/reproduction device by using the cleaning body, and cancels the closing-down of the recording/reproduction device after the cleaning.

10. A library apparatus comprising:

a storage unit storing a cartridge that accommodates a recording medium that records data;

a carrier unit carrying the cartridge;

a recording/reproduction unit recording data onto the recording medium or reproducing data from the recording medium;

a cleaning unit cleaning the recording medium; and a control unit driving the carrier unit to carry the cartridge ejected from the recording/reproduction unit to the cleaning unit for cleaning of the recording medium, wherein when data recording/reproduction is unable to be performed for a particular recording medium in the recording/reproduction unit, the particular recording medium is cleaned by the cleaning unit so that another recording/reproduction unit is used to record data onto the cleaned recording medium or reproduce data from the cleaned recording medium.

11. The library apparatus of claim 10, wherein the cartridge is carried from the recording/reproduction unit to the cleaning unit through detection of a data error.

12. A library apparatus control method comprising the steps of:

loading a recording medium into one of a plurality of recording/reproduction devices and recording or reproducing data;

cleaning the recording medium when it is impossible to record data onto the recording medium or reproduce data from the recording medium; and loading the cleaned recording medium into a recording/reproduction device other than the recording/reproduction device unable to record/reproduce data and recording or reproducing data.

13. The library apparatus control method of claim 12, wherein the cleaning of the recording medium includes transferring dirt to a cleaning body by driving the cleaning body that removes the dirt from the medium surfaces of the recording medium to run at a speed different from that of the recording medium and by pressing the cleaning body against a recording surface of the recording medium.

14. The library apparatus control method of claim 12, wherein the cleaning of the recording medium includes using a plurality of cleaning bodies removing dirt from the medium surfaces of the recording medium, pressing the cleaning bodies against one and the other side of the recording medium, and driving the cleaning bodies to run at a speed different from that of the recording medium.

15. The library apparatus control method of claim 12, wherein the recording/reproduction device is loaded with a cleaning body to clean a recording/reproduction head of the recording/reproduction device.

16. A control method for a library apparatus provided with a plurality of recording/reproduction devices, the library apparatus recording or reproducing data by carrying a recording medium from a storage unit that stores the recording medium to the recording/reproduction devices using a carrier unit, the control method comprising the steps of:

when data recording/reproduction is unable to be performed to or from the recording medium, ejecting the recording medium from the recording/reproduction device which attempted to perform data recording/reproduction to the recording medium;

driving the carrier unit to carry the recording medium from the recording/reproduction device to the cleaning unit for cleaning the recording medium;

closing down the recording/reproduction device unable to record/reproduce data and inhibiting the carrier unit from carrying the recording medium to the recording/reproduction device being closed down; and carrying the cleaned recording medium to the recording/reproduction device other than the recording/reproduction device being closed down.

* * * * *